March 18, 1958

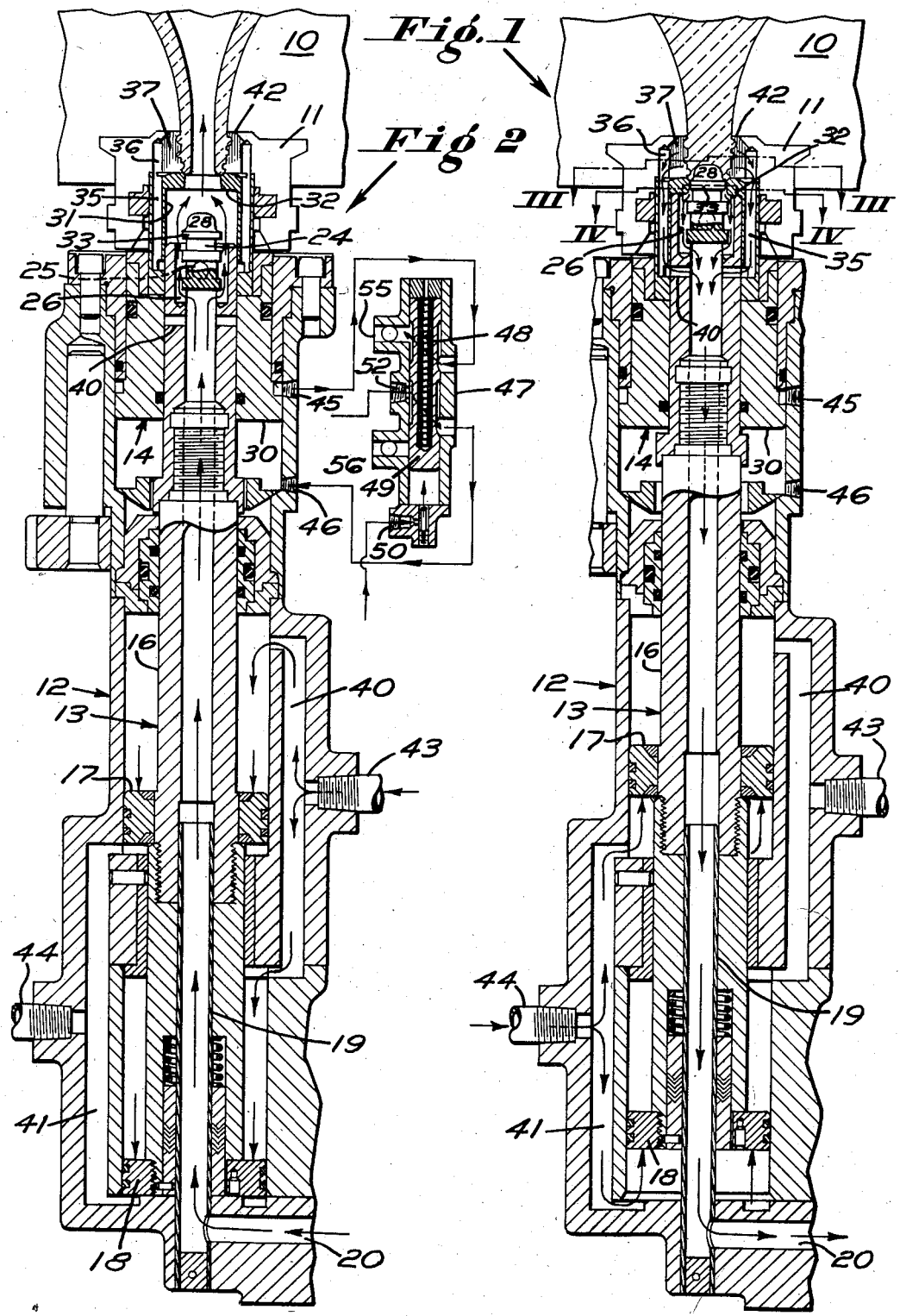

J. O. NAVA, JR., ET AL 2,826,867

VACUUM SETTLE AND COUNTERBLOW APPARATUS
FOR BOTTLE MAKING MACHINES

Filed July 18, 1955

John O. Nava, Jr.,
Angelo J. Buffone,
& Kenneth Grinnen,
INVENTORS

BY

Beau, Brooks, Buckley & Beau,
ATTORNEYS.

United States Patent Office 2,826,867
Patented Mar. 18, 1958

2,826,867

VACUUM SETTLE AND COUNTERBLOW APPARATUS FOR BOTTLE MAKING MACHINES

John O. Nava, Jr., Angelo J. Buffone, and Kenneth Grinnen, Brockway, Pa., assignors to Brockway Glass Company, Inc., Brockway, Pa.

Application July 18, 1955, Serial No. 522,794

4 Claims. (Cl. 49—18)

This invention relates to the manufacture of hollow glass articles and more particularly to apparatus for manufacturing bottles and the like in a rapid and efficient manner and with a minimum of settle waves and other structural defects commonly encountered in this art.

The present invention relates generally to glass bottle or glass container manufacturing machines of the general type wherein a glass parison or preform is first produced, then subsequently blown to final shape in a finished mold. In producing the parison or preforms it is common to force the gob of molten glass into the neck ring portion of the parison mold by air pressure, then subject the glass to a counterblowing action through the neck ring to blow the glass into conformation with the blank or parison mold.

Initially the air pressure for forcing the glass downwardly into an inverted parison mold to insure filling of the neck ring mold portion thereof was accomplished by positive air pressure introduced from above. This necessitated a certain time delay for bringing the air pressure means into position at the top of the parison mold and for subsequently moving it out of position and replacing it with a top closure for the mold. Subsequently it has been proposed to produce this charge settling force by a subatmospheric pressure at the lower portion of the charge to draw the glass down into the neck ring to fully fill the latter prior to counterblowing. This latter procedure is referred to in the art as suction or vacuum settle.

The present invention provides novel apparatus of this general type wherein the vacuum settle pressure is introduced and applied in a novel manner and wherein the apparatus is greatly simplified by employing a common central axial passage upwardly through the mechanism below the neck ring for conducting both the subatmospheric vacuum settle pressure and, subsequently, the super-atmospheric counterblowing pressure.

This improved mechanism results in very great advantages since fairly small savings in certain portions of the time cycle produce significant improvements in operation. For one thing, the time consumed in effecting settling of the glass charge, which must precede the application of counterblowing pressure, is critical in the degree of local cooling of the charge which takes place. This local cooling must be counteracted by what is known in the art as a corkage reheat period.

The inability to control temperature changes of the charge at will and the inability to control the temperatures of the different parts of the incipient preform produces settle waves of various degrees. Setlle waves and their general causes are well known but generally regarded as a necessary evil, of greater or less degree although many previous attempts have been made, with varying degrees of success, to minimize or ameliorate the settle wave condition.

The present invention reduces settle waves to a new and significant minimum by reducing the over-all time from the time when the charge is delivered to the parison mold to the time when counterblowing pressure may be applied. This new arrangement and apparatus is due in considerable part to the manner in which vacuum settle pressure is introduced and applied so that settling of the gob is accomplished in a minimum time. This reduction in the time cycle is effected both by reason of the manner in which the pressure is actually applied and by reason of the simplification of the mechanism itself so that more rapid mechanical operation of the plunger and needle mechanisms is feasible.

Various modifications may be made in the mechanism shown in the accompanying drawings and described in the following specification, such mechanism being set forth in detail by way of example only. The spirit and scope of the invention are not limited otherwise than as defined in the appended claims.

In the drawings,

Fig. 1 is a vertical cross-sectional view through the neck ring portion and underlying mechanism of the parison, preform, or blank mold station of a glass bottle machine showing the parts in the vacuum settle position;

Fig. 2 is a view similar to Fig. 1 but showing the parts in the counterblow position;

Figure 3:
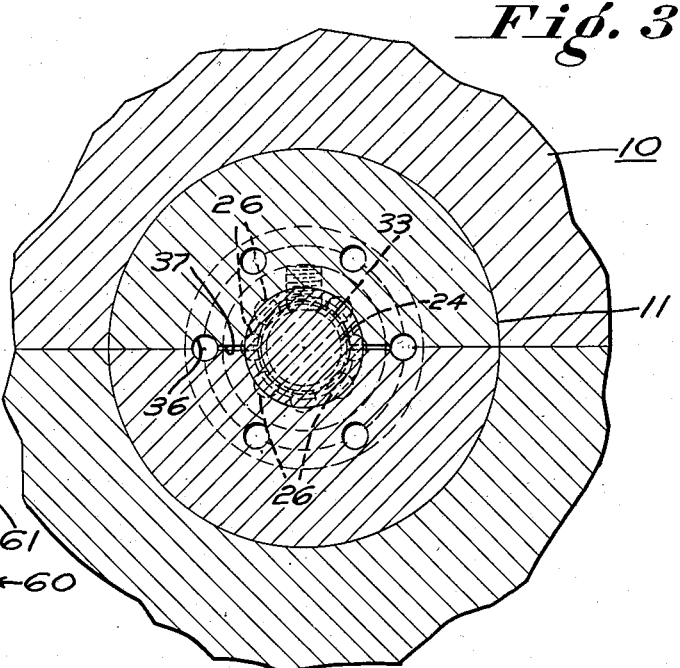
Fig. 3 is a fragmentary cross-sectional view on the line III—III of Fig. 1.

The apparatus illustrated herein is intended for use in and as a part of the very well-known "Hartford I. S. Machine" or individual section machine which is widely used in the manufacture of bottles and other glass containers. This machine generally is disclosed and described in detail in Ingle Patent No. 1,911,119, dated May 23, 1933, and the present drawings illustrate only the neck ring portion of the parison or blank mold station of such a machine, together with the underlying plunger and thimble mechanism for vacuum settle and counterblowing purposes, it being understood that the mechanism shown herein is readily adaptable to machines of the general type here identified and to similar glass bottle or glass container forming machines.

Like characters of reference denote like parts throughout the several figures of the drawings and, referring particularly to Figs. 1 and 2, the numeral 10 designates a conventional inverted blank or parison mold and the numeral 11 designates a neck ring mold.

A relatively fixed generally cylindrical support structure designated generally by the numeral 12 is mounted coaxially with and beneath the parison and neck ring molds and forms cylindrical fluid pressure chambers for supporting and guiding two relatively vertical slidable assemblies or mechanisms, namely a plunger assembly designated generally by the numeral 13 and a thimble assembly designated generally by the numeral 14.

The plunger assembly 13 comprises a generally tubular central support structure 16 which has fixed thereto a pair of pistons 17 and 18 and the lower portion of which telescopes slidably over a fixed vertical conduit member 19. Conduit member 19 is fixed at its lower end in the supporting structure 12 and the latter includes a fluid pressure conduit 20 which communicates with the interior of tubular member 19 and thence upwardly through the tubular support structure 16 of plunger assembly 13.

The plunger itself is designated 24 and fits within and is fixed to the upper end of the tubular central support structure 16. The upper end of tubular support structure 16 is bored to receive the plunger 24 and the latter is removably held in place by a setscrew 25. A circular series of drilled holes 26 surrounds the bore which receives plunger 24, in open communication with the bore, and at their lower ends the drilled holes communicate with the interior of tubular support structure 16. An air passage is thus established which in effect surrounds the plunger 24 and forms an upward continuation of the conduit member 19 and the interior of the tubular support structure 16.

The upper end of plunger 24 is rounded as at 28 to produce a conventional depression in the lower neck portion of the incipient parison to form the beginning of the parison interior which is later developed by air pressure. This application of air pressure to expand the parison to conformance with the interior of the blank is commonly called counterblowing.

The thimble assembly 14 comprises a piston member 30 which has fixed to its upper end a thimble 31 of inverted cup shape having an upper radial wall portion 32 which is adapted to lie against the bottom of the mold portion of neck ring mold 11 and receive therein an upper annular enlargement 33 of plunger 24.

In the initial neck forming position of the apparatus, during which vacuum settle pressure is applied, the plunger 24 and thimble 31 are at their upper limit positions, as shown in Fig. 1, and cooperate with the neck ring mold to form a complete molding cavity for the neck or finish portion of the container.

The skirt portion of thimble 31 is provided with a number of vertical passages 35 and upward continuations of the passages 35 are formed in the neck ring mold 11 at the plane of parting of such neck ring mold as at 36. Figs. 1 and 2 show the abutting surface of one of the complemental parts of neck ring mold 11 and, as indicated at 37, such meeting surface is slightly relieved over portions extending radially inwardly from the passages 36 to the cavity of the neck ring mold.

When the thimble and plunger assemblies are both in the raised position illustrated in Fig. 1 the lower ends of the passages 35 of thimble member 31 communicate with a number of radial passages 40 which are formed in tubular support structure 16 to establish fluid communication between the interior of tubular structure 16 and the passages 35 and 36.

The annular enlargement 33 of plunger 24 is of slightly less diameter than the opening in the upper wall of thimble 31 to form an annular fluid pressure passage several thousandths of an inch in thickness between the plunger and the thimble when both are in raised position.

The central portion of the upper end of neck ring mold 11 and the adjacent surface of blank mold 10 are slightly spaced in the area indicated by the numeral 42 and a similar radial clearance passage is provided between the central part of the upper surface of thimble 31 and the adjacent lower surface of the neck ring mold 11. These latter clearances are of only a few thousandths of an inch and therefore do not show in Figs. 1 and 2.

Thus when the plunger and thimble assemblies are in the upper limit position illustrated in Fig. 1 and subatmospheric pressure is applied to passage 20 it is communicated through tubular member 19, through the interior of plunger support structure 16, and through the passages 26 and 40 in the upper end thereof. Thus a subatmospheric settle pressure force is applied to the neck ring cavity portion of the mold space through the annular clearance zone between enlargement 33 of the plunger and the upper central opening in thimble 31, through the clearance between the meeting surfaces of the two parts of the neck ring mold as at 37 and through the two radially disposed clearance spaces between the upper end of the neck ring mold and the adjacent lower surface of the parison mold, as at 42, and between the lower surface of the neck ring mold and the upper surface of thimble 31.

Following the vacuum settle step in the operation of the present apparatus, plunger 24 is withdrawn to the position illustrated in Fig. 2 and, with the thimble 31 in the same upper limit position as previously, counterblow air pressure is applied by way of passage 20, tubular member 19, the interior of plunger support structure 16 including the drilled holes 26 at the upper end thereof, and thence through the interior of thimble 31 and the central bore in the upper end thereof to the interior of the incipient parison.

It will be noted that, in the main, a single series of passages serves successively for both the subatmospheric settle pressure and the super-atmospheric counterblow pressure. Furthermore, the structure of the present invention is such that both pressures are communicated to their points of actual effectiveness in an extremely direct and efficient manner. The possibilities of dissipation of pressure both by leakage and by tortuosity of transmission passages is avoided or held to a previously unattained minimum.

Fluid pressure for reciprocating plunger assembly 13 in properly timed relation with respect to the operation of the machine generally is derived directly from the main valve block of the machine and since the nature of such valve block and its operation is well known in the glass container machine art it will not be illustrated or described herein. The cylindrical support structure 12 is provided with a fluid passage 40 which leads to the upper sides of both of the pistons 17 and 18 of plunger assembly 13 and a passage 41 which leads to the lower sides of both pistons. Fluid pressure connections 43 and 44 apply operating air pressure in properly timed sequence under the control of the main valve block of the machine.

The piston 30 of thimble assembly 14 is supplied with operating air pressure for downward and upward movement by a pair of fluid pressure passages 45 and 46, respectively, which lead from a servo-operated valve 47. Valve 47 is normally in the position illustrated in Fig. 2 wherein pressure is applied to passage 46 to hold the thimble upwardly. This is accomplished by a pilot valve air pressure connection 50 leading from the aforementioned main valve block of the machine. A spring 48 urges valve element 49 of servo-valve 47 downwardly and operates to reverse the servo-valve passage connections to apply operating air pressure to passage 45 when pilot air pressure is cut off from connection 50. The valve 49 may be spring urged in either direction and air operated in the other direction, as desired. When either passage 45 or 46 is pressure connected the other is vented to atmosphere as at 55 and 56. Servo-valve 47 is employed to control the supply of operating air pressure to thimble piston 30 for the reason that a higher operating air pressure is applied at supply passage 52 thereof than the normal operating air pressure available at the main valve block of the machine.

Figure 5:
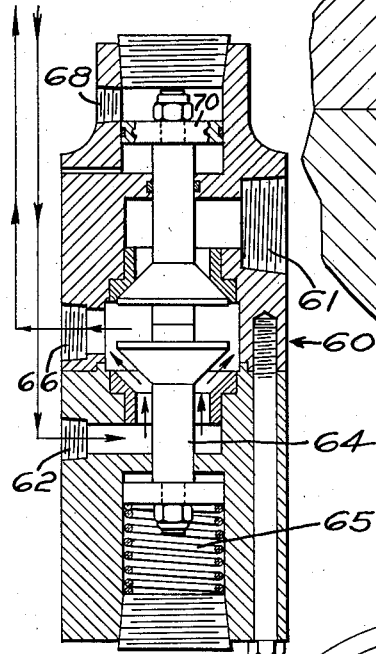
Fig. 5 is a longitudinal cross-sectional view through the valve for controlling the application of vacuum settle and counterblow air pressure.
Figure 4:
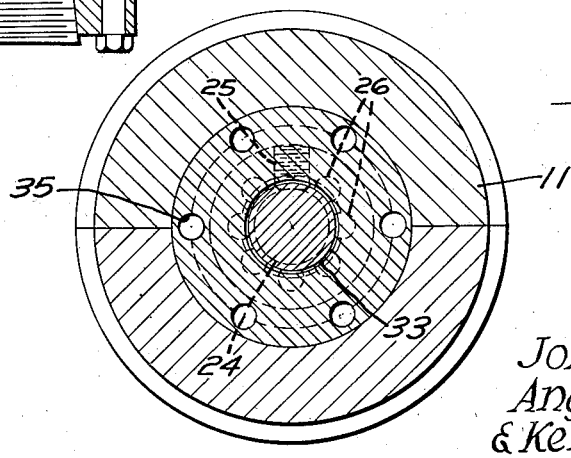
Fig. 4 is a horizontal cross-sectional view on the line IV—IV of Fig. 1.

The alternate application of sub-atmospheric vacuum settle pressure and super-atmospheric counterblow pressure to the passage 20 of the main support 12 of the present apparatus is by means of a servo-controlled valve shown in Fig. 5 and designated generally by the numeral 60. Passage 61 of valve 60 is connected to a vacuum manifold and passage 62 is connected to an air pressure source leading from the main valve block of the machine.

A valve member 64 is normally biased to the position shown in Fig. 5 by a spring 65, in which position counterblow air pressure passage 62 is connected to the outlet passage 66 of the valve which leads to passage 20. Application of servo air pressure from the main valve block to a passage 68 of valve 60 acts against a piston 70 to reverse valve 64 and connect vacuum passage 61 to outlet passage 66 and thence to passage 20.

We claim:

1. Apparatus for forming a molten glass charge into a hollow article comprising means providing an inverted mold cavity and terminating downwardly in a neck mold, a generally cylindrical relatively stationary support disposed beneath said mold cavity means and having a pair of axially spaced upper and lower cylindrical chambers therein, a plunger vertically slidable in said support and adapted to project upwardly into the neck mold cavity, a piston on said plunger and slidable in the lower of said chambers, sleeve means disposed coaxially about said plunger and adapted to project upwardly against said neck mold, a piston on said sleeve means slidable in the upper of said chambers, means for selectively connecting operating fluid pressure through the upper and lower portions of said upper and lower chambers to move said pistons vertically in predetermined timed relation, a central axial pressure passage through said plunger and a pressure connection at the lower end thereof beneath said pistons and chambers, valve means in said pressure connection for selectively alternately applying subatmospheric settle pressure and super-atmospheric counterblow pressure to said central axial pressure passage, pressure passages in said plunger leading from said central axial pressure passage for supplying vacuum settle pressure to said sleeve means when the sleeve means and the plunger are in raised positions, and an upwardly extending air passage space about the upper end of said plunger for transmitting counterblow pressure through said sleeve means when said plunger is lowered.

2. Apparatus for forming a molten glass charge into a hollow article comprising means providing an inverted mold cavity and terminating downwardly in a neck mold, a generally cylindrical relatively stationary support disposed beneath said mold cavity means and having a pair of axially spaced upper and lower cylindrical chambers therein, a plunger vertically slidable in said support and adapted to project upwardly into the neck mold cavity, a piston on said plunger and slidable in the lower of said chambers, sleeve means disposed coaxially about said plunger and adapted to project upwardly against said neck mold, a piston on said sleeve means slidable in the upper of said chambers, means for selectively connecting and disconnecting operating fluid pressure to said upper and lower chambers to move said pistons vertically in predetermined time relation, a central axial pressure passage through said plunger and a pressure connection at the lower end thereof beneath said pistons and chambers, valve means in said pressure connection for selectively alternately applying subatmospheric settle pressure and super-atmospheric counterblow pressure to said central axial pressure passage, pressure passages in said plunger leading from said central axial pressure passage for supplying vacuum settle pressure to said sleeve means when the sleeve means and the plunger are in raised positions, and an upwardly extending air passage space about the upper end of said plunger for transmitting counterblow pressure through said sleeve means when said plunger is lowered.

3. Apparatus for forming a molten glass charge into a hollow article comprising means providing an inverted mold cavity and terminating downwardly in a neck mold, a generally cylindrical relatively stationary support disposed beneath said mold cavity means and having a pair of axially spaced upper and lower cylindrical chambers therein, a plunger vertically slidable in said support and adapted to project upwardly into the neck mold cavity, a piston on said plunger and slidable in the lower of said chambers, sleeve means disposed coaxially about said plunger and adapted to project upwardly against said neck mold, said sleeve means having upwardly extending vacuum settle pressure passages therein, a piston on said sleeve means slidable in the upper of said chambers, means for selectively connecting operating fluid pressure through the upper and lower portions of said upper and lower chambmers to move said pistons vertically in predetermined timed relation, a central axial pressure passage through said plunger and a pressure connection at the lower end thereof beneath said pistons and chambers, valve means in said pressure connection for selectively alternately applying subatmospheric settle pressure and super-atmospheric counterblow pressure to said central axial pressure passage, pressure passages in said plunger leading from said central axial pressure passage and adapted to register with said sleeve means pressure passages when the sleeve means and the plunger are in raised positions.

4. Apparatus for forming a molten glass charge into a hollow article comprising means providing an inverted mold cavity and terminating downwardly in a neck mold, a generally cylindrical relatively stationary support disposed beneath said mold cavity means and having a pair of axially spaced upper and lower cylindrical chambers therein, a plunger vertically slidable in said support and adapted to project upwardly into the neck mold cavity, a piston on said plunger and slidable in the lower of said chambers, sleeve means disposed coaxially about said plunger and adapted to project upwardly against said neck mold, said sleeve means having upwardly extending vacuum settle pressure passages therein, a piston on said sleeve means slidable in the upper of said chambers, means for selectively connecting operating fluid pressure through the upper and lower portions of said upper and lower chambers to move said pistons vertically in predetermined timed relation, a central axial pressure passage through said plunger and a pressure connection at the lower end thereof beneath said pistons and chambers, valve means in said pressure connection for selectively alternately applying subatmospheric settle pressure and super-atmospheric counterblow pressure to said central axial pressure passage, pressure passages in said plunger leading from said central axial pressure passage and adapted to register with said sleeve means pressure passages when the sleeve means and the plunger are in raised positions, and an upwardly extending air passage space about the upper end of said plunger for transmitting counterblow pressure through said sleeve means when said plunger is lowered.

References Cited in the file of this patent

UNITED STATES PATENTS

| | | |
|---|---|---|
| 1,911,119 | Ingle | May 23, 1933 |
| 2,129,614 | Bridges | Sept. 6, 1938 |
| 2,466,669 | Winder | Apr. 12, 1949 |